US009851784B2

(12) United States Patent
Kato et al.

(10) Patent No.: US 9,851,784 B2
(45) Date of Patent: Dec. 26, 2017

(54) MOVEMENT LINE CONVERSION AND ANALYSIS SYSTEM, METHOD AND PROGRAM

(71) Applicant: FUJI XEROX CO., LTD., Tokyo (JP)

(72) Inventors: Noriji Kato, Kanagawa (JP); Takeshi Onishi, Kanagawa (JP); Keiichi Nemoto, Kanagawa (JP); Ryota Ozaki, Kanagawa (JP); Daisuke Ikeda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/672,576

(22) Filed: Mar. 30, 2015

(65) Prior Publication Data

US 2016/0085297 A1 Mar. 24, 2016

(30) Foreign Application Priority Data

Sep. 22, 2014 (JP) .................................. 2014-192506

(51) Int. Cl.
| | |
|---|---|
| *G06K 9/00* | (2006.01) |
| *G06F 3/01* | (2006.01) |
| *G06Q 30/02* | (2012.01) |
| *G06T 7/20* | (2017.01) |

(52) U.S. Cl.
CPC .......... *G06F 3/011* (2013.01); *G06K 9/00342* (2013.01); *G06Q 30/0201* (2013.01); *G06T 7/20* (2013.01); *G06T 2207/30196* (2013.01); *G06T 2207/30241* (2013.01)

(58) Field of Classification Search
CPC ............ G06K 9/00275; G06K 9/00335; G06T 7/004; G06T 7/20
See application file for complete search history.

(56) References Cited

U.S. PATENT DOCUMENTS

| | | | | |
|---|---|---|---|---|
| 2009/0003653 | A1* | 1/2009 | Takahata ............... | G06T 7/2093 382/103 |
| 2009/0164284 | A1* | 6/2009 | Koiso ................ | G06K 9/00335 705/7.29 |
| 2009/0257624 | A1* | 10/2009 | Ikumi .................... | G06Q 30/02 382/113 |
| 2009/0268028 | A1* | 10/2009 | Ikumi ................ | G06K 9/00295 348/150 |
| 2010/0138037 | A1* | 6/2010 | Adelberg ............. | G06Q 10/087 700/241 |

(Continued)

FOREIGN PATENT DOCUMENTS

| | | |
|---|---|---|
| JP | 2009-048229 A | 3/2009 |
| JP | 2009-265830 A | 11/2009 |
| JP | 2011-248836 A | 12/2011 |

*Primary Examiner* — Vu Le
*Assistant Examiner* — Guillermo Rivera-Martinez
(74) *Attorney, Agent, or Firm* — Oliff PLC (57) ABSTRACT

A non-transitory computer readable medium stores a program that causes a computer to execute a position conversion process. The process includes storing actual layout information and virtual layout information, the actual layout information defining a layout of a first subject within an actual structure, the virtual layout information defining a layout of a second subject within a virtual structure; acquiring a human position within the actual structure; and converting the human position in the actual layout information into the human position in the virtual layout information.

8 Claims, 12 Drawing Sheets

(56) References Cited

U.S. PATENT DOCUMENTS

| | | | |
|---|---|---|---|
| 2011/0007152 A1* | 1/2011 | Sekine | G01S 3/784 348/135 |
| 2013/0054142 A1* | 2/2013 | Moriguchi | G06Q 10/06311 701/519 |
| 2015/0066551 A1* | 3/2015 | Harada | G06Q 10/06 705/7.11 |
| 2015/0123545 A1* | 5/2015 | Fushimi | H05B 37/0218 315/130 |
| 2015/0363798 A1* | 12/2015 | Aihara | G06F 17/30876 705/7.29 |

* cited by examiner

| SUBJECT | POSITION |
|---|---|
| ENTRANCE | (10, 10) |
| PRODUCT A | (100, 100) |
| PRODUCT B | (200, 100) |
| PRODUCT C | (100, 200) |
| CASH REGISTER | (200, 200) |
| RESTROOM | (200, 300) |

| SUBJECT | POSITION | | |
| --- | --- | --- | --- |
| | STORE 1 | STORE 2 | ... |
| ENTRANCE | (100, 150) | (190, 20) | ... |
| PRODUCT A | (10, 20) | (10, 270) | ... |
| PRODUCT B | (650, 240) | (340, 210) | ... |
| PRODUCT C | (190, 290) | (180, 350) | ... |
| CASH REGISTER | (50, 70) | (50, 70) | ... |
| RESTROOM | (400, 20) | (590, 20) | ... |

FIG. 5

| TIME | STORE 1 | | ... | STORE 2 | | ... |
|---|---|---|---|---|---|---|
| | CUSTOMER 1 | CUSTOMER 2 | | CUSTOMER 3 | CUSTOMER 4 | |
| 12:00:00 | (100, 150) | (100, 150) | ... | — | — | ... |
| 12:00:30 | (100, 200) | (120, 150) | ... | — | (190, 20) | ... |
| 12:01:00 | (100, 300) | (130, 150) | ... | (190, 20) | (200, 50) | ... |
| ... | ... | ... | ... | ... | ... | ... |

| TIME | STORE 1 | | | STORE 2 | | |
|---|---|---|---|---|---|---|
| | CUSTOMER 1 | CUSTOMER 2 | ... | CUSTOMER 3 | CUSTOMER 4 | ... |
| 12:00:00 | (10, 10) | (10, 10) | ... | — | — | ... |
| 12:00:30 | (10, 13) | (12, 10) | ... | — | (10, 10) | ... |
| 12:01:00 | (10, 20) | (13, 10) | ... | (10, 10) | (11, 25) | ... |
| ... | ... | ... | ... | ... | ... | ... |

| CUSTOMER ID | MOVEMENT LINE ID ||
|---|---|---|
| | ACTUAL STORE | VIRTUAL STORE |
| CUSTOMER 1 | 1 | 1 |
| CUSTOMER 2 | 2 | 2 |
| CUSTOMER 3 | 3 | 3 |
| ⋮ | ⋮ | ⋮ |

VIRTUAL STORE (HEAT MAP DISPLAY)

FIG. 11

|  | REGION 1 | REGION 2 | REGION 3 | REGION 4 | REGION 5 | REGION 6 |
|---|---|---|---|---|---|---|
| REGION 1 | 0.11 | 0.33 | 0.10 | 0.21 | 0.12 | 0.12 |
| REGION 2 | 0.41 | 0.12 | 0.02 | 0.11 | 0.22 | 0.12 |
| REGION 3 | 0.34 | 0.34 | 0.02 | 0.20 | 0.15 | 0.05 |
| REGION 4 | 0.03 | 0.20 | 0.20 | 0.21 | 0.23 | 0.13 |
| REGION 5 | 0.30 | 0.07 | 0.21 | 0.50 | 0.01 | 0.01 |
| REGION 6 | 0.11 | 0.22 | 0.12 | 0.21 | 0.10 | 0.23 | ns
MOVEMENT LINE CONVERSION AND ANALYSIS SYSTEM, METHOD AND PROGRAM

CROSS-REFERENCE TO RELATED APPLICATIONS

This application is based on and claims priority under 35 USC 119 from Japanese Patent Application No. 2014-192506 filed Sep. 22, 2014.

BACKGROUND

Technical Field

The present invention relates to non-transitory computer readable media, information processing apparatuses, and position conversion methods.

SUMMARY

According to an aspect of the invention, there is provided a non-transitory computer readable medium storing a program that causes a computer to execute a position conversion process. The process includes storing actual layout information and virtual layout information, the actual layout information defining a layout of a first subject within an actual structure, the virtual layout information defining a layout of a second subject within a virtual structure; acquiring a human position within the actual structure; and converting the human position in the actual layout information into the human position in the virtual layout information.

BRIEF DESCRIPTION OF THE DRAWINGS

Exemplary embodiments of the present invention will be described in detail based on the following figures, wherein.

DETAILED DESCRIPTION

Exemplary Embodiments

Configuration of Actual Store

Figure 1:
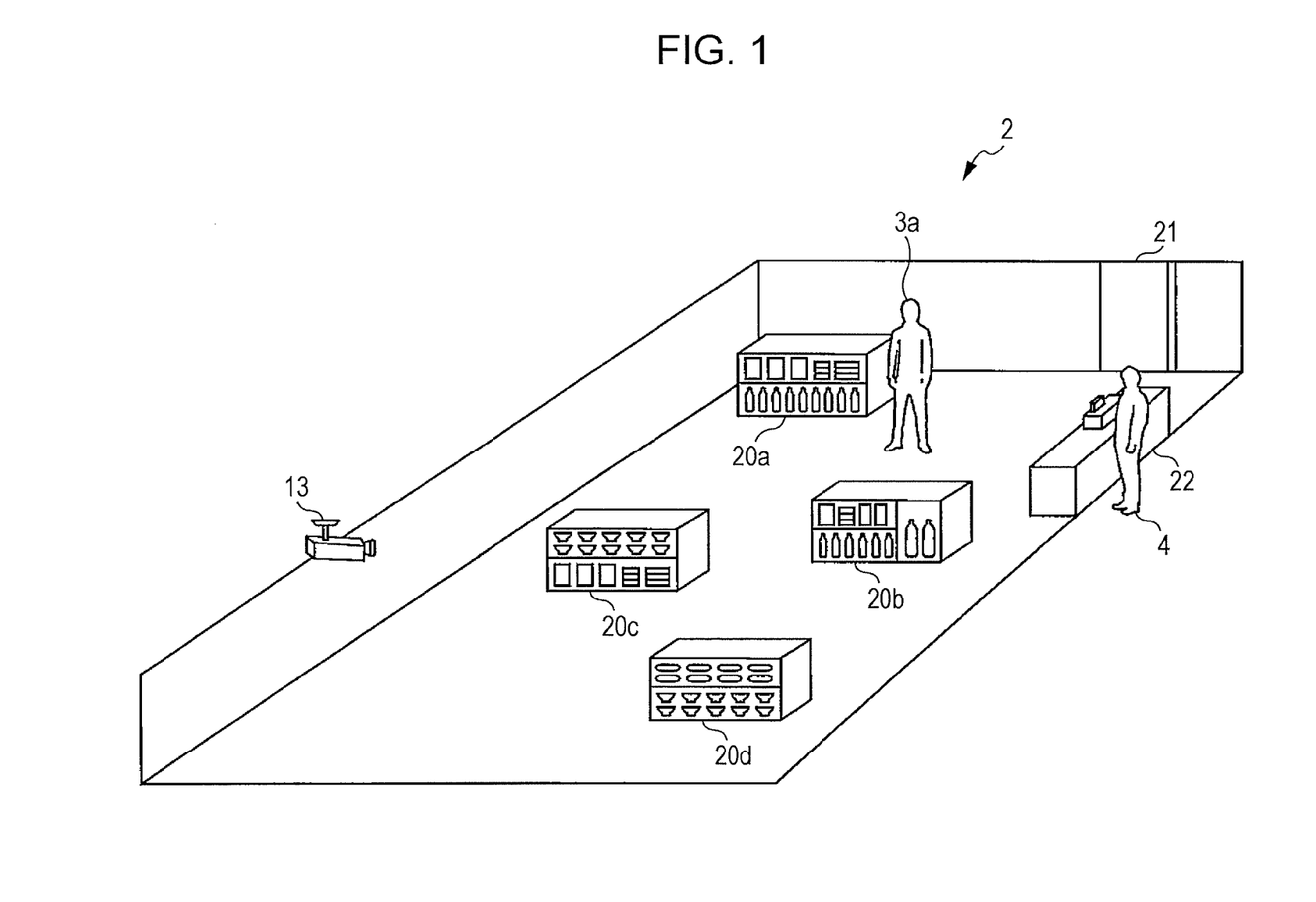
FIG. 1 schematically illustrates a configuration example of an actual store.

FIG. 1 schematically illustrates a configuration example of an actual store.

An actual store 2 is an example of an enclosed space in which a camera 13 is installed, and is a retail store, such as a convenience store. The actual store 2 has objects (referred to as "subjects" hereinafter) arranged in the actual store 2, such as multiple products 20a to 20d placed on shelves, a store entrance 21, and a cash register 22. Each of the products 20a to 20d may indicate a single product, a product category, or a product group displayed on a product shelf. Furthermore, in addition to the above examples, the subjects may include a restroom, a photocopier, a cash dispenser, and an automatic vending machine. Moreover, each of the subjects may be of a stationary type or a type that is movable within the actual store 2. The actual store 2 is an example of a structure and may be, for example, a shopping mall, a building, an airport, a station, a hospital, a school, or a leisure facility so long as subjects are installed therein.

In the actual store 2, a customer 3a entering through the entrance 21 looks at and searches through the products 20a to 20d. If the customer 3a finds a desired product, the customer 3a carries the product to the cash register 22, where a clerk 4 performs operation and the customer 3a pays for the product. When the payment is completed at the cash register 22, sales data is stored using, for example, a point-of-sale (POS) system.

In the actual store 2, the camera 13 is installed. A video image captured by the camera 13 is recognized in an information processing apparatus 1, which will be described later, and the positions of the subjects are recognized. Moreover, the position of the customer 3a is recognized from the video image captured by the camera 13, and the movement line of the customer 3a is also recognized by recording the position thereof in time sequence. The term "video image" refers to a collection of multiple frames (still images) captured in time sequence, and the multiple frames are reproduced in time sequence.

Although the camera 13 is shown as a single unit in FIG. 1, multiple cameras may be prepared. Moreover, as an alternative to a normal camera, an omnidirectional camera may be used. Furthermore, the camera 13 may be of a video-image capturing type or may be of a type that captures still images at predetermined intervals. The position where the camera 13 is installed is pre-registered such that the coordinates in the captured video image correspond to the positional coordinates in the actual store 2.

Furthermore, multiple actual stores 2 may exist, in which the products 20a to 20d are arranged in different layouts or identical layouts. Moreover, the multiple actual stores 2 may have different products laid out therein.

Configuration of Information Processing Apparatus

Figure 2:
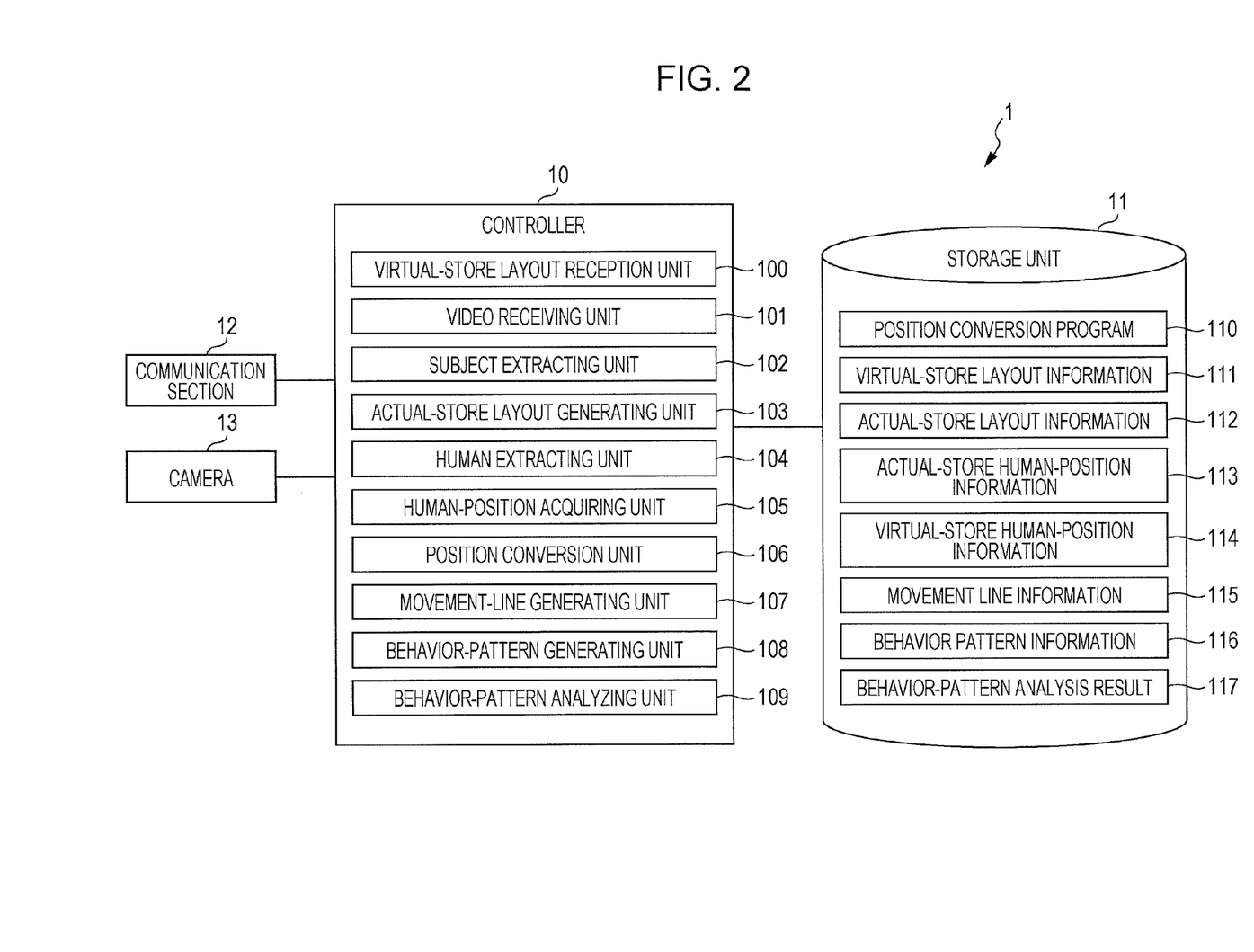
FIG. 2 is a block diagram illustrating a configuration example of an information processing apparatus according to an exemplary embodiment.

FIG. 2 is a block diagram illustrating a configuration example of an information processing apparatus according to an exemplary embodiment.

An information processing apparatus 1 includes a controller 10 constituted of, for example, a central processing unit (CPU) that controls each section and executes various kinds of programs, a memory 11 that is constituted of a storage medium, such as a flash memory, and that stores information, a communication section 12 that communicates with the outside via a network, and the camera 13 capable of capturing a video image or a still image of the actual store 2.

The controller 10 executes a position conversion program 110, which will be described later, so as to function as, for example, a virtual-store layout reception unit 100, a video receiving unit 101, a subject extracting unit 102, an actual-store layout generating unit 103, a human extracting unit 104, a human-position acquiring unit 105, a position conversion unit 106, a movement-line generating unit 107, a behavior-pattern generating unit 108, and a behavior-pattern analyzing unit 109.

The virtual-store layout reception unit 100 receives virtual-store layout information 111, which defines the layout of subjects in a virtual store (structure), from, for example, an external terminal apparatus via the communication section 12. The virtual-store layout information 111 may be preliminarily stored in the memory 11. The virtual store (structure) may or may not exist as an actual store (structure).

The video receiving unit 101 receives video information captured and generated by the camera 13.

If an image of each pre-registered subject is included in all of or some of the frames in the video information received by the video receiving unit 101, the subject extracting unit 102 extracts the coordinates of the subject in the actual store 2 together with time information of the frames. With regard to the extraction method, the feature of the pre-registered image is read, and a similar image is extracted by pattern-matching.

Alternatively, the pre-registered image may be preliminarily converted into a feature amount. For example, a feature amount is obtained by extracting a feature point from an image by difference-of-Gaussians calculation and then extracting a scale-invariant feature transform (SIFT) feature amount from the feature point. Furthermore, with regard to the pre-registered image, a common image may be shared among multiple stores, or a pre-registered image may be stored for each store if it varies from store to store, such as the entrance.

The actual-store layout generating unit 103 generates actual-store layout information 112 as information related to the layout of the subjects in the actual store 2 based on the coordinates of each subject extracted by the subject extracting unit 102 from all of or some of the frames in the video information received by the video receiving unit 101. Alternatively, the actual-store layout information 112 may be received from, for example, an external terminal apparatus via the communication section 12 without being extracted from the video information. Specifically, an actual-store layout in which the layout of the subjects is defined by a user may be received. Moreover, as an alternative to the example in which each subject is extracted from the video information, the actual-store layout information 112 may be generated by calculating the position of each subject based on the distance from a receiver by attaching a transmitter to each subject.

The human extracting unit 104 extracts a human when a human image is included in all of or some of the frames in the video information received by the video receiving unit 101. If there are multiple humans, the human extracting unit 104 may be configured to identify the multiple humans and to identify a pre-registered human (such as the clerk or a regular customer).

The human-position acquiring unit 105 acquires the positional coordinates of the human in the actual store 2 extracted by the human extracting unit 104 in time sequence of the frames. As an alternative to the example in which the human is extracted from the video information, the positional coordinates of the human in the actual store 2 may be acquired by installing a device communicable with, for example, a communication terminal (such as a portable telephone) or a card owned by the customer 3a or the clerk 4. Furthermore, by using a positional-information acquisition function (e.g., a global-positioning-system (GPS) function) equipped in the communication terminal, the coordinates of the human in the actual store 2 may be acquired. Although the above description relates to the example in which the position of the human in the actual store 2 is acquired as coordinates, the acquisition mode is not limited to coordinates.

Furthermore, the human-position acquiring unit 105 converts the positional coordinates acquired from, for example, the video information, the communication terminal, or the card into positional coordinates in a coordinate system similar to that of the actual-store layout information 112 and stores the converted positional coordinates as actual-store human-position information 113 into the memory 11. If the coordinate system of the positional coordinates acquired from, for example, the video information, the communication terminal, or the card is identical to the coordinate system of the actual-store layout information 112, the aforementioned conversion may not be performed.

Based on the subject layout in the virtual-store layout information 111 and the subject layout in the actual-store layout information 112, the position conversion unit 106 converts the actual-store human-position information 113, which indicates the positional coordinates of the human in the actual-store layout information 112, into virtual-store human-position information 114 indicating the positional coordinates of the human in the virtual-store layout information 111 (which will be described in detail later).

Based on the actual-store human-position information 113 and the virtual-store human-position information 114, the movement-line generating unit 107 generates movement line information 115 indicating a movement trajectory of each human.

The behavior-pattern generating unit 108 generates behavior pattern information 116 indicating a human movement pattern based on the virtual-store human-position information 114. The behavior pattern information 116 may be associated with the sales data obtained at the cash register 22.

The behavior-pattern analyzing unit 109 generates a behavior-pattern analysis result 117 by analyzing the behavior pattern information 116 based on information, such as the store location area, sales, and age groups.

The memory 11 stores, for example, the position conversion program 110 that causes the controller 10 to operate as the above-described units 100 to 109, the virtual-store layout information 111, the actual-store layout information 112, the actual-store human-position information 113, the virtual-store human-position information 114, the movement line information 115, the behavior pattern information 116, and the behavior-pattern analysis result 117. The actual-store layout information 112 is an example of actual layout information that defines a subject layout within an actual structure. The virtual-store layout information 111 is an example of virtual layout information that defines a subject layout in a virtual structure.

Operation of Information Processing Apparatus

Next, the operation according to this exemplary embodiment will be described by being separated into layout registration operation (1), human-position extraction operation (2), and analysis operation (3).

1. Layout Registration Operation

First, the virtual-store layout reception unit 100 receives virtual-store layout information 111 defining the layout of the subjects (second subjects) in the virtual store from, for example, an external terminal apparatus via the communication section 12.

Figure 3:
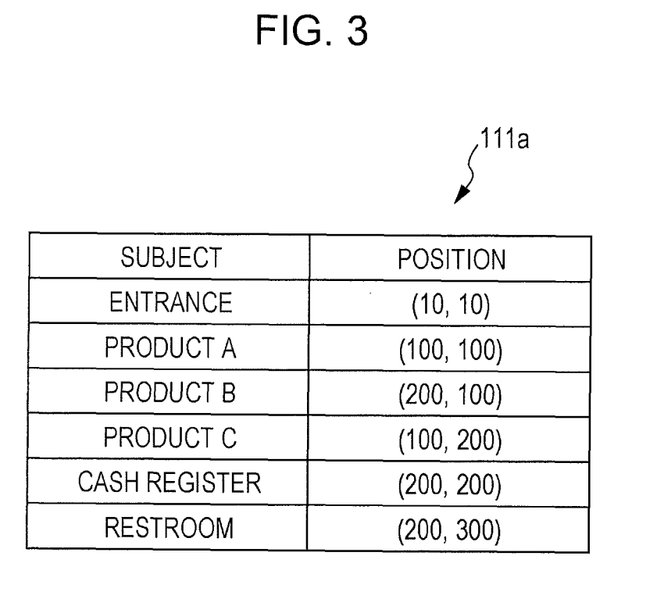
FIG. 3 schematically illustrates a specific example of virtual-store layout information.

FIG. 3 schematically illustrates a specific example of the virtual-store layout information 111.

Virtual-store layout information 111a is an example of the virtual-store layout information 111 and has the name of each subject and the position indicating the coordinates of the subject. For example, a subject "entrance" is disposed at coordinates (10, 10) in the virtual store, a subject "product A" is disposed at coordinates (100, 100) in the virtual store, and so on.

Subsequently, the video receiving unit 101 receives video information captured and generated by the camera 13.

Then, if an image of each pre-registered subject is included in all of or some of the frames in the video information received by the video receiving unit 101, the subject extracting unit 102 extracts the coordinates of the subject in the actual store 2.

Subsequently, the actual-store layout generating unit 103 generates actual-store layout information 112 as information related to the layout of the subjects in the actual store 2 based on the coordinates of each subject (first subject) extracted by the subject extracting unit 102. Alternatively, the actual-store layout information 112 may be input in advance.

Figure 4:
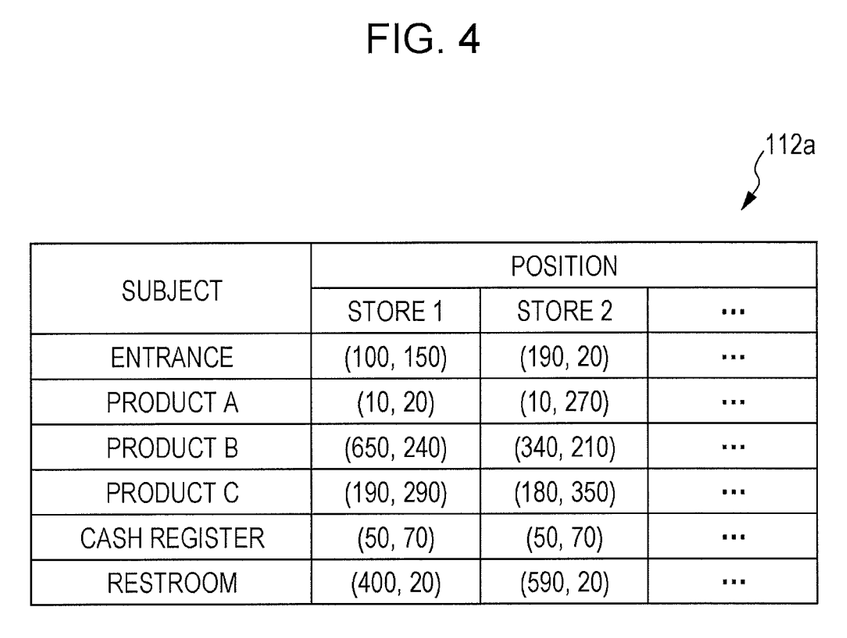
FIG. 4 schematically illustrates a specific example of actual-store layout information.

FIG. 4 schematically illustrates a specific example of the actual-store layout information 112.

Actual-store layout information 112a is an example of the actual-store layout information 112 and has the name of each subject and the position indicating the coordinates of the subject for each store. For example, in store 1, a subject "entrance" is disposed at coordinates (100, 150) in the actual store. In store 2, a subject "entrance" is disposed at coordinates (190, 20) in the actual store.

Although the subjects "entrance", "product A", "product B", "product C", "cash register", and "restroom" are identical between the virtual-store layout information 111a and the actual-store layout information 112a, that is, the first subjects and the second subjects are identical to each other in this example, the correspondence relationship may be different therebetween. For example, the second subjects in the virtual-store layout information 111a may be subjects "entrance", "product A", "product B", "product C", "cash register", and "restroom", whereas the first subjects in the actual-store layout information 112a may be subjects "automatic door", "product a", "product B", "product C", "cash register", and "lavatory". In this case, information is stored in which the subjects "entrance" and "automatic door" correspond to each other, the subjects "product a" and "product A" correspond to each other, and the subjects "restroom" and "lavatory" correspond to each other.

Furthermore, in a case where multiple actual stores are targeted, information is stored in which the first subjects and the second subjects are set in correspondence with each other for each actual store. The first subjects and the second subjects do not necessarily have to correspond to each other in a one-to-one relationship and may alternatively correspond to each other in an n-to-m relationship (n and m each being an integer larger than or equal to 1).

2. Human-Position Extraction Operation

Subsequently, the human extracting unit 104 extracts a human when a human image is included in all of or some of the frames in the video information received by the video receiving unit 101.

Then, the human-position acquiring unit 105 acquires the coordinates of the human in the actual store 2 extracted by the human extracting unit 104 in time sequence.

Furthermore, the human-position acquiring unit 105 converts the acquired positional coordinates into positional coordinates in a coordinate system similar to that of the actual-store layout information 112 and stores the converted positional coordinates as actual-store human-position information 113 into the memory 11. If the coordinate system of the acquired positional coordinates is identical to the coordinate system of the actual-store layout information 112, the aforementioned conversion may not be performed.

Figure 5:
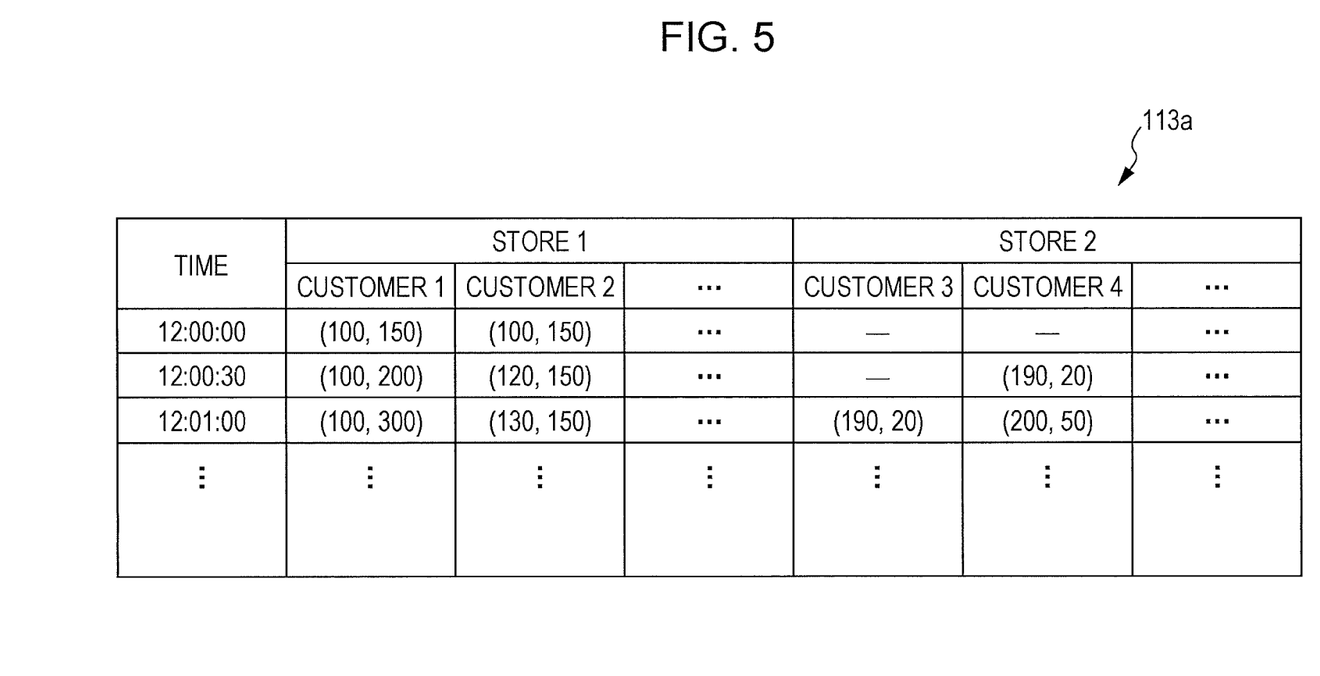
FIG. 5 schematically illustrates a specific example of actual-store human-position information.

FIG. 5 schematically illustrates a specific example of the actual-store human-position information 113.

Actual-store human-position information 113a is an example of the actual-store human-position information 113 and has the acquired time and the position indicating the coordinates in the actual store 1 for each store and each customer.

The position acquisition time is acquired by, for example, identifying each customer every 30 seconds.

Subsequently, based on the subject layout in the virtual-store layout information 111 and the subject layout in the actual-store layout information 112, the position conversion unit 106 converts the actual-store human-position information 113, which indicates the positional coordinates of the human in the actual-store layout information 112, into virtual-store human-position information 114 indicating the positional coordinates of the human in the virtual-store layout information 111. For example, the positional coordinates of the human in the virtual store is determined by using the distance between the positional coordinates of the human and the positional coordinates of multiple subjects in the actual store and also by using the distance between the positional coordinates of the human and the positional coordinates of multiple subjects in the virtual store. Specifically, the positional coordinates of the human in the virtual store may be determined by using a difference between the distance from the positional coordinates of the human to the positional coordinates of the multiple subjects in the actual store and the distance from the positional coordinates of the human to the positional coordinates of the multiple subjects in the virtual store. The difference between these distances is desirably, but not limited to, a minimal value. A specific calculation method will be described later in detail in a description of operation for generating movement line information.

Instead of the aforementioned distances, the position conversion unit 106 may convert a human position with regard to the first subjects in the actual-store layout information 112 into a human position with regard to the second subjects in the virtual-store layout information 111.

Figure 6:
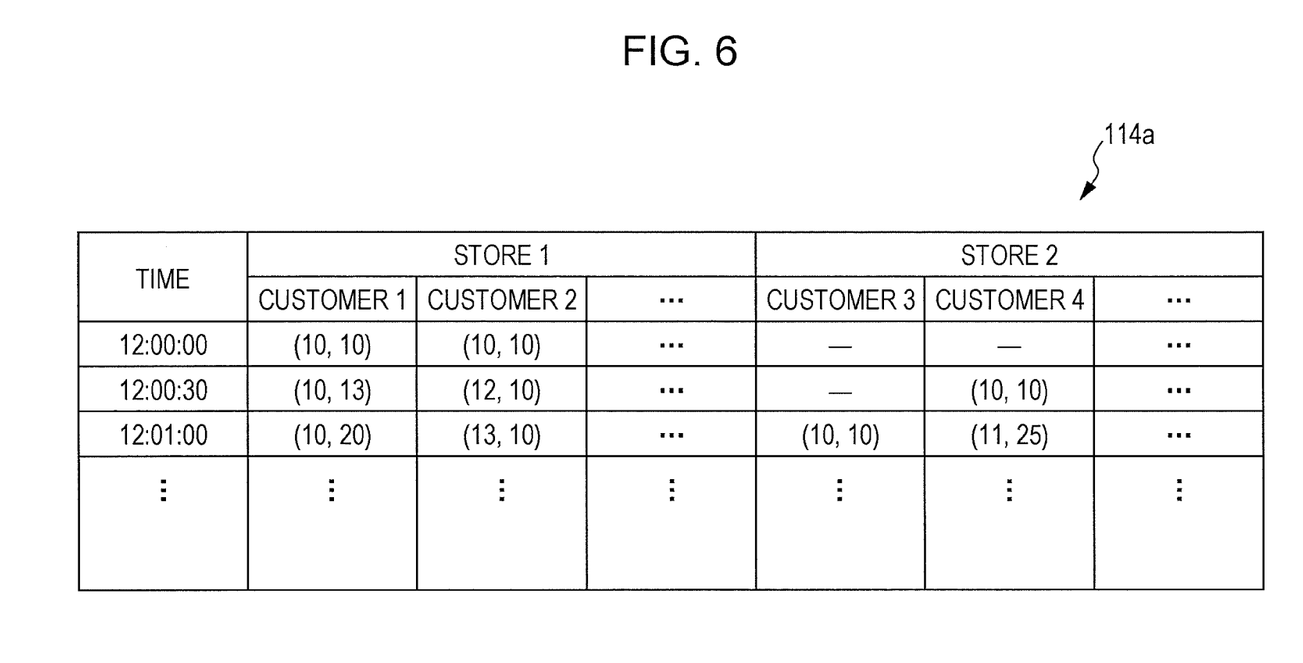
FIG. 6 schematically illustrates a specific example of virtual-store human-position information.

FIG. 6 schematically illustrates a specific example of the virtual-store human-position information 114.

Virtual-store human-position information 114a is an example of the virtual-store human-position information 114 and is converted from the actual-store human-position information 113a. The virtual-store human-position information 114a has the time and the position of each customer for each store.

Subsequently, the movement-line generating unit 107 generates movement line information 115 indicating a movement trajectory of each human based on the actual-store human-position information 113 and the virtual-store human-position information 114.

Figure 7:
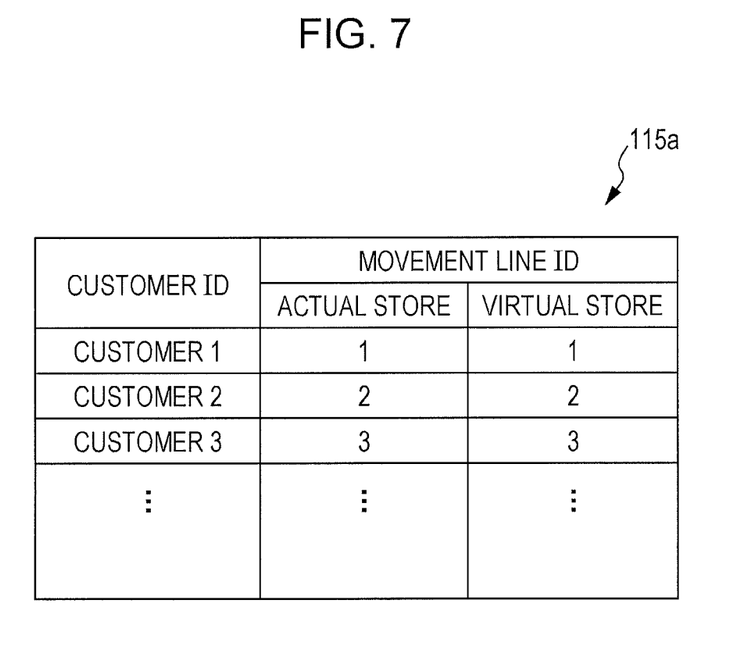
FIG. 7 schematically illustrates a specific example of movement line information.

FIG. 7 schematically illustrates a specific example of the movement line information 115.

Movement line information 115a is an example of the movement line information 115 and has a customer ID, a movement line ID in an actual store, and a movement ID in the corresponding virtual store. In other words, the movement line information 115a is information for setting a movement line in an actual store and a movement line in a virtual store in correspondence with each other.

Figure 8A:
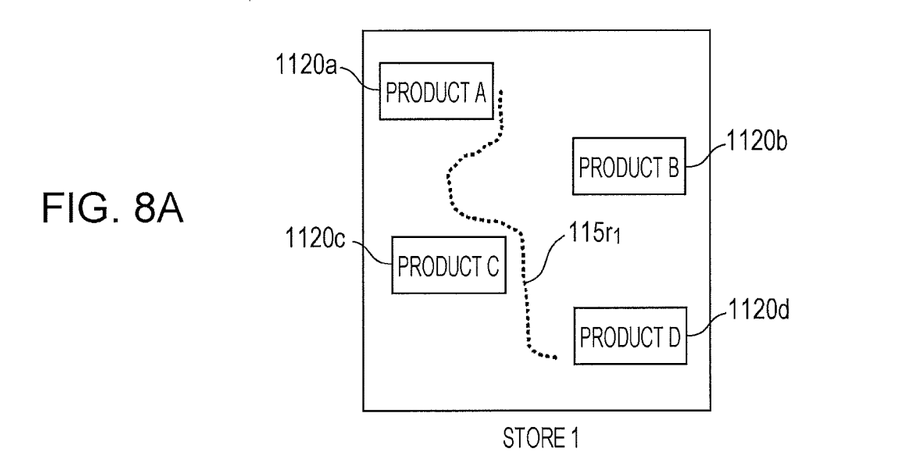
FIGS. 8A and 8B schematically illustrate examples of movement lines rendered on actual store layouts.
Figure 8B:
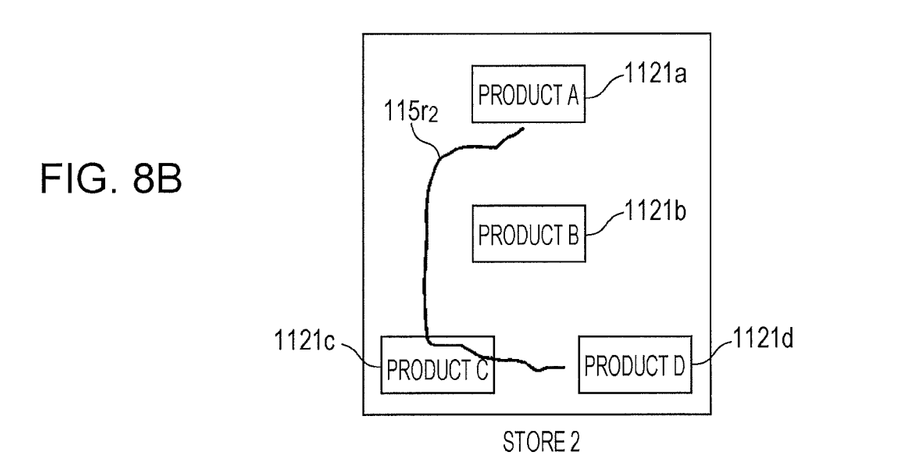

FIGS. 8A and 8B schematically illustrate examples of movement lines rendered on actual store layouts.

FIG. 8A displays a movement line $115r_1$ of a certain user in "store 1" together with subjects $1120a$ to $1120d$ corresponding to products A to D.

Likewise, FIG. 8B displays a movement line $115r_2$ of a certain user in "store 2" together with subjects $1121a$ to $1121d$ corresponding to products A to D.

Based on the subject layout in the virtual-store layout information 111 and the subject layout in the actual-store layout information 112, the position conversion unit 106 converts the human movement lines $115r_1$ and $115r_2$ in "actual store 1" and "actual store 2" into human movement lines in respective virtual stores.

The position conversion unit 106 may have a smoothing function for smoothing a movement line. By using the smoothing function when converting a point X on a movement line in an actual store into a point Y on a movement line in a virtual store, for example, a difference between the distance from the point X to each subject (first subject) in the actual store and the distance from the point Y to each subject (second subject) in the virtual store may be minimized, and the movement line may be smoothened. Specifically, assuming that the distance from the point X to an i-th subject in the actual store is defined as $d_i$ and the distance from the point Y to the i-th subject in the virtual store is defined as $d'_i$, the point X on the movement line in the actual store is converted into the point Y in the coordinate system of the virtual store, at which the following cost function L becomes minimal.

$$L = \frac{\sum_{i=1}^{n}(\alpha d_i - d'_i)^2}{\sum_{i=1}^{n} d'^2_i} + \lambda \|Y(t) - Y(t-1)\| \qquad (1)$$

In this case, α denotes a factor for adjusting the scale of the coordinates in the actual store to the scale of the coordinates in the virtual store, and is a ratio between the sum of the distances between all subjects in the virtual store and the sum of the distances between all subjects in the actual store. The second term on the right side denotes the distance from the position of a point Y corresponding to one previous time point and the position of a current point Y, and λ is a predetermined parameter. A point Y(t) at which the cost function L becomes minimal may be determined based on a maximum gradient descent method with Y(t−1) as an initial value.

Figure 9A:
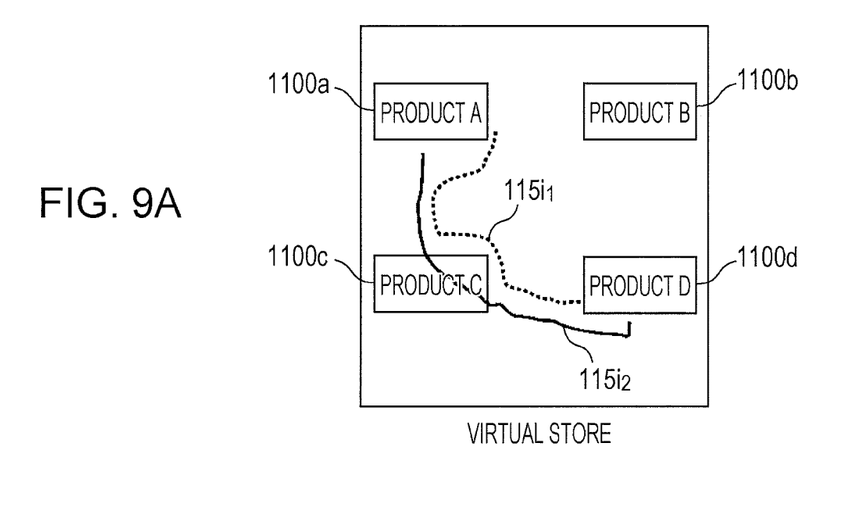
FIGS. 9A and 9B schematically illustrate examples of movement lines rendered on virtual store layouts.
Figure 9B:
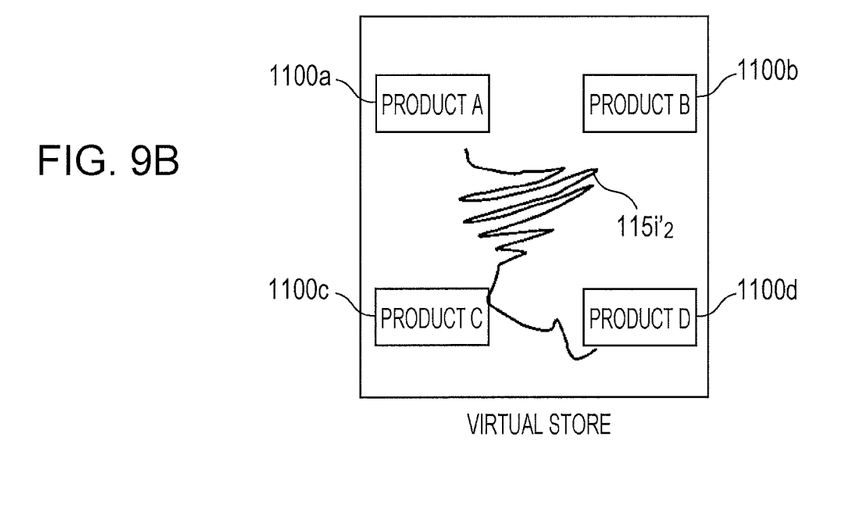

FIGS. 9A and 9B schematically illustrate examples of movement lines rendered on virtual store layouts.

As shown in FIG. 9A, by using numerical expression (1) mentioned above, the movement line $115r_1$ in FIG. 8A and the movement line $115r_2$ in FIG. 8B are converted into a movement line $115i_1$ and a movement line $115i_2$, respectively.

If the movement line $115r_2$ in FIG. 8B is converted without using numerical expression (1) above such that the difference between the distance from the positional coordinates of the human to the coordinates of each subject in the actual store and the distance from the positional coordinates of the human to the coordinates of each subject in the virtual store is simply made minimal, a non-smooth movement line $115i'_2$ shown in FIG. 9B is obtained.

Figure 10:
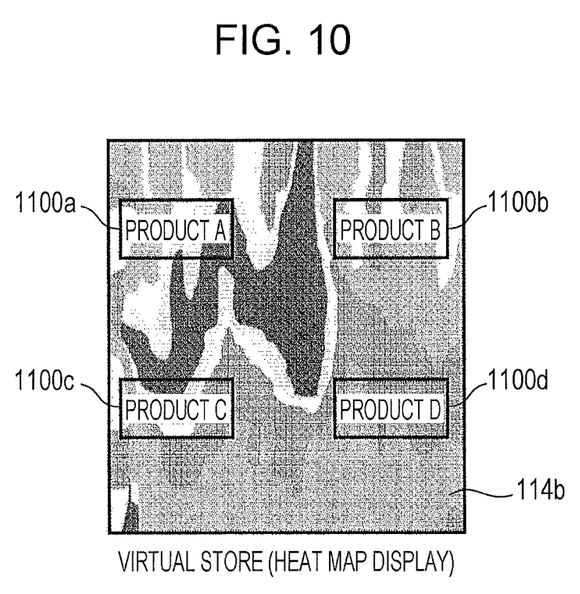
FIG. 10 schematically illustrates an example in which the virtual-store human-position information is displayed as a heat map of a virtual store.

FIG. 10 schematically illustrates an example in which the virtual-store human-position information 114 is displayed as a heat map of the virtual store.

As shown in FIG. 10, the virtual store may be segmented into mesh regions, and the time spent in each region may be calculated from the virtual-store human-position information 114 and be displayed as a heat map display 114b.

3. Analysis Operation

Subsequently, the behavior-pattern generating unit 108 generates behavior pattern information 116 indicating a human movement pattern based on the virtual-store human-position information 114.

The behavior pattern information 116 is generated by, for example, using movement lines of multiple users in a certain store, segmenting the virtual store into mesh regions, and calculating a probability P (B|A) at which a customer located in a certain region A moves to a region B after a specific time period. The time interval may be adjustable in accordance with the distance between the subjects in the actual store.

Figure 11:
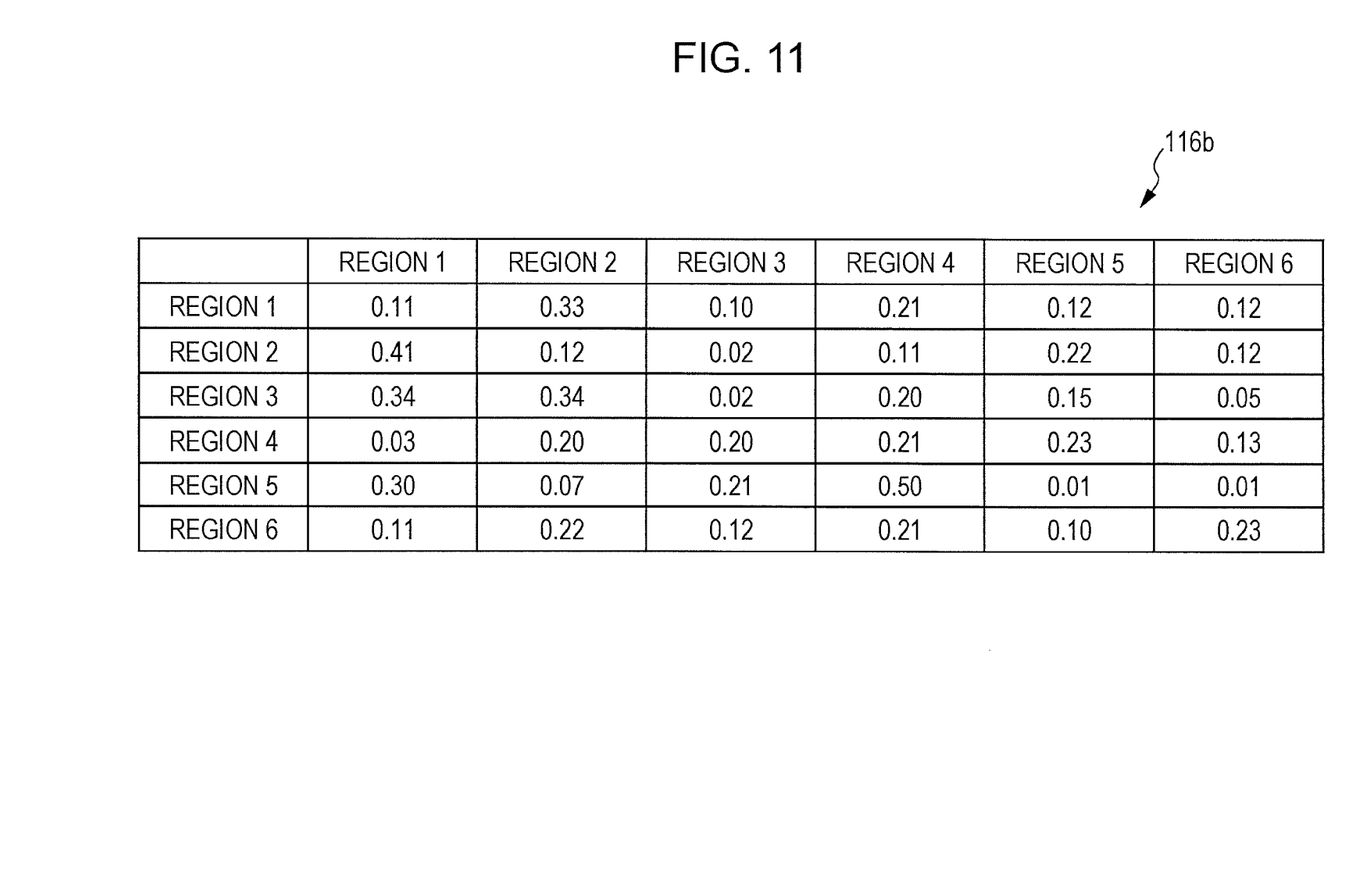
FIG. 11 schematically illustrates a specific example of behavior pattern information.

FIG. 11 schematically illustrates a specific example of the behavior pattern information 116.

As shown in FIG. 11, the behavior pattern information 116 has a vertical item corresponding to the region A and a horizontal item corresponding to the region B and indicates a probability of movement from the region A to the region B. For example, a probability of movement from "region 1" to "region 5" is 0.12.

Alternatively, the behavior-pattern generating unit 108 may use behavior patterns as probabilistic transition models and calculate the degree of similarity between the behavior patterns by calculating the likelihood between the behavior patterns.

Subsequently, the behavior-pattern analyzing unit 109 generates a behavior-pattern analysis result 117. The analysis is performed based on various viewpoints, such as the store location area, sales, and age groups.

For example, the behavior-pattern analyzing unit 109 searches for a certain movement line in the movement line information 115 based on the store name, time, sales, and so on as conditions, and displays the movement line on a virtual store map.

Figure 12:
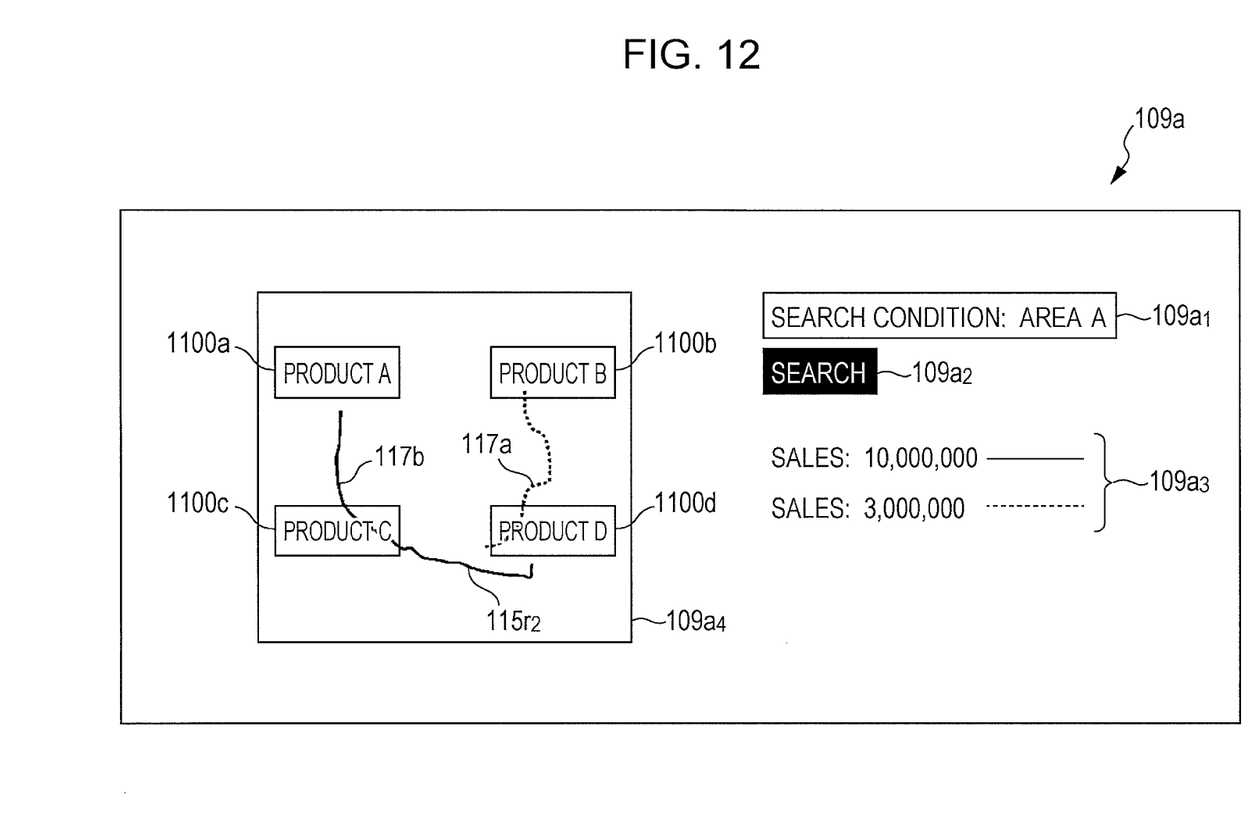
FIG. 12 illustrates behavior-pattern analysis operation.

FIG. 12 illustrates behavior-pattern analysis operation.

A behavior-pattern analysis screen 109a shown in FIG. 12 is a screen displayed on a display (not shown) of the information processing apparatus 1 by the behavior-pattern analyzing unit 109 or on a display of an external terminal connected via the communication section 12. The behavior-pattern analysis screen 109a has a search-condition input frame $109a_1$ for inputting a movement-line search condition, a search button $109a_2$ for executing a search based on the condition input to the search-condition input frame $109a_1$, an attribute display field $109a_3$ showing movement-line attributes as a search result, and a movement-line display field $109a_4$ displaying a movement line or lines as a search result or results together with the layout of the virtual store.

The movement-line display field $109a_4$ has subjects $1100a$ to $1100d$ laid out therein, as well as movement lines $117a$ and $117b$ as search results.

As shown in FIG. 12, the behavior-pattern analyzing unit 109 may display the multiple movement lines as search results in a superposed manner on a single virtual store map or may display the multiple movement lines on different virtual store maps. For example, as shown in FIG. 12, a user may analyze the difference between the displayed movement lines $117a$ and $117b$ by comparing a movement line in a store with poor sales in "area A" (sales of 3,000,000) with a movement line in a store with high sales (sales of 10,000,000) and ascertaining that there is a problem in one of the movement lines.

Furthermore, the behavior-pattern analyzing unit 109 may search for a store having a similar behavior pattern by using the behavior pattern information $116b$ and display the store on the behavior-pattern analysis screen $109a$, or may categorize the store based on the behavior pattern and display the store on the behavior-pattern analysis screen $109a$. Moreover, the behavior-pattern analyzing unit 109 may display how the behavior pattern changes in different time periods of a single store.

Effects of Exemplary Embodiment

According to the above exemplary embodiment, based on the subject layout in the virtual-store layout information 111 and the subject layout in the actual-store layout information 112, a human position acquired in the actual store 2 is converted into a position in the virtual store. Thus, a position of a customer in the actual-store layout information 112 may be converted into a position in the virtual-store layout information 111 having a different layout.

Furthermore, based on the subject layout in the virtual-store layout information 111 and the subject layout in the actual-store layout information 112, a trajectory of a human position acquired in the actual store 2 is converted into a trajectory in the virtual store. Thus, the behavior (movement line) of a customer in the actual store may be converted into the behavior (movement line) in the virtual store having a different layout. Moreover, by employing numerical expression (1), the movement line may be smoothened.

Furthermore, since movement lines in multiple actual stores are displayed on a single virtual layout, movement lines in multiple actual stores with different subject layouts may be compared with each other.

Other Exemplary Embodiments

The present invention is not limited to the above exemplary embodiment and may permit various modifications so long as they are within the spirit of the invention.

In the above exemplary embodiment, the human position or behavior in the actual store 2 is converted into the position or behavior in the virtual store having a different layout. As an alternative to the actual store 2, the human behavior in a structure may be converted into the behavior in a virtual structure having a different layout. Examples of the structure include a shopping mall, a building, an airport, a station, a hospital, a school, and a leisure facility. Moreover, the structure may be of a movable type, such as an airplane or a marine vessel. In the case of one of these structures, subjects may be appropriately employed in accordance with the structure, such as a retail store or a restaurant within the structure. Furthermore, as an alternative to the position or behavior of a customer, the exemplary embodiment of the present invention may be similarly applied to, for example, a clerk, a student, or a tourist.

In the above exemplary embodiment, the functions of the units 100 to 109 of the controller 10 are implemented by a program. Alternatively, all of or some of the units may be implemented by hardware, such as an application specific integrated circuit (ASIC). Moreover, the program used in the above exemplary embodiment may be provided by being stored in a storage medium, such as a compact disc read-only memory (CD-ROM). Furthermore, for example, the steps described in the above exemplary embodiment may be interchanged or deleted, or may have an additional step or steps added thereto within a scope that does not alter the spirit of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a position conversion process, the process comprising:

storing first actual layout information, second actual layout information, and virtual layout information, the first actual layout information defining a layout of an actual subject within a first actual structure and the second layout information defining a layout of the actual subject within a second actual structure, the first actual structure and the second actual structure being different actual structures having different layouts, the virtual layout information defining a layout of a virtual subject that represents the actual subject within a virtual structure;

acquiring a first human position within the first actual structure;

acquiring a second human position in the second actual structure;

converting the first human position in the first actual layout information into a first human position in the virtual structure in the virtual layout information; and converting the second human position in the second actual layout information into a second human position in the virtual structure in the virtual layout information, wherein the first human position from the first actual structure and the second human position from the second actual structure are converted into the same virtual structure in the same virtual layout.

2. The non-transitory computer readable medium according to claim 1, wherein the acquiring the first human position includes acquiring the first human position from at least one of a video image and a still image, the at least one of the video image and the still image being captured by a camera.

3. The non-transitory computer readable medium according to claim 1, the process further comprising:

generating movement line information from at least one of a trajectory of the first human position within the first actual structure and a trajectory of the first human position within the virtual structure.

4. The non-transitory computer readable medium according to claim 3, wherein the converting the first human position includes smoothing the trajectory of the first human position within the virtual structure.

5. A non-transitory computer readable medium storing a program causing a computer to execute a position conversion process, the process comprising:

storing first actual layout information, second actual layout information, and virtual layout information, the first actual layout information defining a layout of an actual subject within a first actual structure and the second layout information defining a layout of the actual subject within a second actual structure, the first actual structure and the second actual structure being different actual structures having different layouts, the virtual layout information defining a layout of a virtual subject that represents the actual subject within a virtual structure;

acquiring a first human position within the first actual structure;

acquiring a second human position in the second actual structure;

converting the first human position with regard to the actual subject in the first actual layout information into a first human position with regard to the virtual subject in the virtual layout information; and converting the second human position with regard to the actual subject in the second actual layout information into a second human position with regard to the virtual subject in the virtual layout information, wherein the first human position from the first actual structure and the second human position from the second actual structure are converted into the same virtual structure in the same virtual layout.

6. An information processing apparatus comprising:

a memory that stores first actual layout information, second actual layout information, and virtual layout information, the first actual layout information defining a layout of an actual subject within a first actual structure and the second layout information defining a layout of the actual subject within a second actual structure, the first actual structure and the second actual structure being different actual structures having different layouts, the virtual layout information defining a layout of a virtual subject that represents the actual subject within a virtual structure; and a processor that:

acquires a first human position within the first actual structure;

acquires a second human position in the second actual structure;

converts the first human position in the first actual layout information into a first human position in the virtual structure in the virtual layout information; and converts the second human position in the second actual layout information into a second human position in the virtual structure in the virtual layout information, wherein the first human position from the first actual structure and the second human position from the second actual structure are converted into the same virtual structure in the same virtual layout.

7. A position conversion method comprising:

storing first actual layout information, second actual layout information, and virtual layout information, the first actual layout information defining a layout of an actual subject within a first actual structure and the second layout information defining a layout of the actual subject within a second actual structure, the first actual structure and the second actual structure being different actual structures having different layouts, the virtual layout information defining a layout of a virtual subject that represents the actual subject within a virtual structure;

acquiring a first human position within the first actual structure;

acquiring a second human position in the second actual structure;

converting the first human position in the first actual layout information into a first human position in the virtual structure in the virtual layout information; and converting the second human position in the second actual layout information into a second human position in the virtual structure in the virtual layout information, wherein the first human position from the first actual structure and the second human position from the second actual structure are converted into the same virtual structure in the same virtual layout.

8. The non-transitory computer readable medium according to claim 1, the process further comprising storing correspondence information, the stored correspondence information indicating how a plurality of first actual subjects within the first actual structure respectively correspond to a plurality of second actual subjects within the second actual structure.

* * * * *